July 25, 1933. L. A. KEMPTON 1,919,949
ELECTRIC HEATING SYSTEM
Filed Sept. 10, 1931
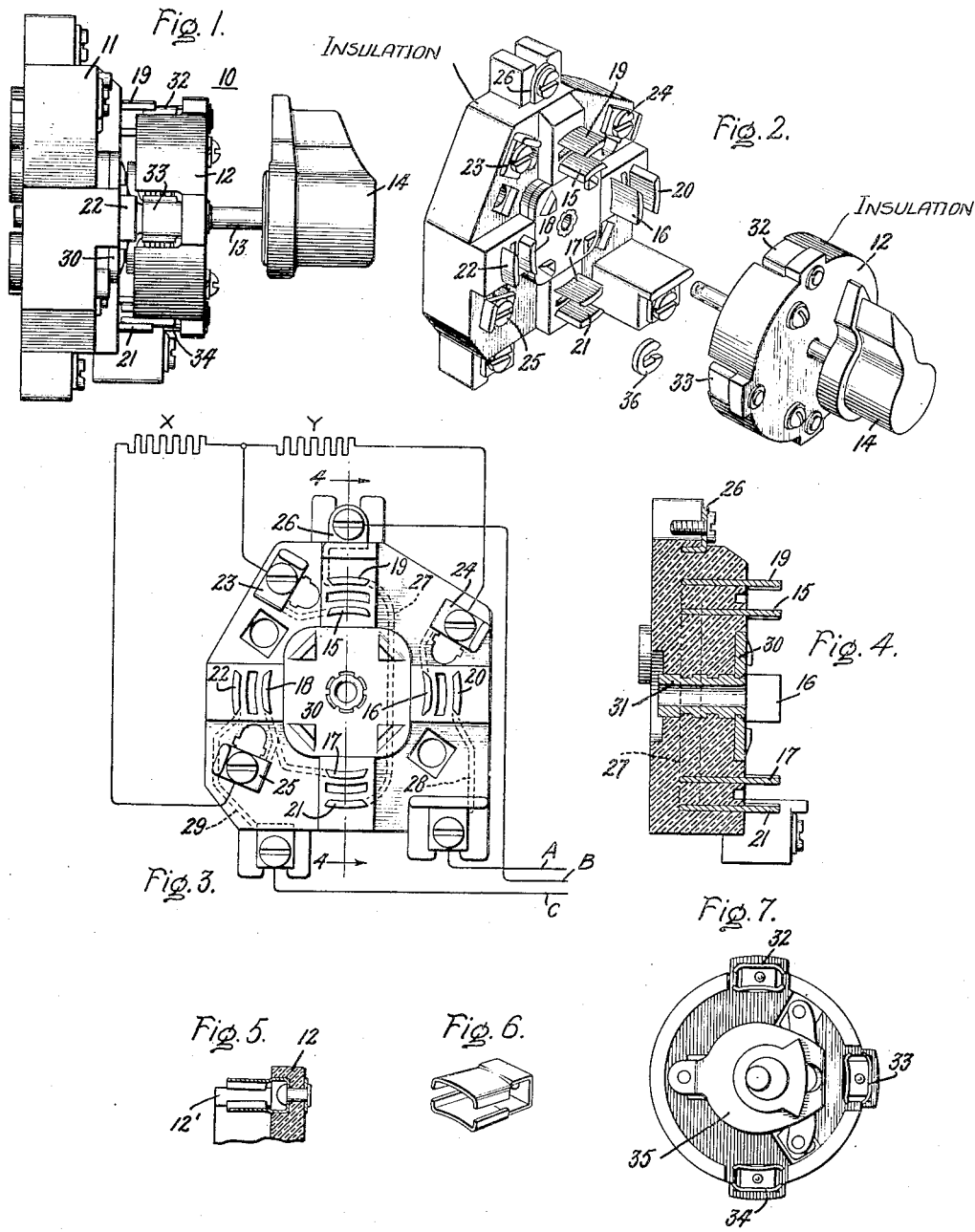
Inventor:
Leslie A. Kempton,
by Charles E. Tullar
His Attorney.

Patented July 25, 1933

1,919,949

UNITED STATES PATENT OFFICE

LESLIE A. KEMPTON, OF TRUMBULL, CONNECTICUT, ASSIGNOR TO GENERAL ELECTRIC COMPANY, A CORPORATION OF NEW YORK

ELECTRIC HEATING SYSTEM

Application filed September 10, 1931. Serial No. 562,120.

My invention relates to an electric heating system and more particularly to an electric switch for controlling the rate of heat generation of heating units in electric appliances such as electric ranges, electric water heaters, and the like.

In electric heating systems of this type, it is common to provide two heating units and change the connections of these units to a three wire source of supply to obtain three different rates of heat generation. In a system in which the supply lines comprise two main lines and a neutral or ground line and the voltage between the main lines is twice the voltage between each main line and the neutral line, the three different rates of heat generation have been obtained by connecting the two units in series to the main line, connecting one unit to one main line and the neutral line, and by connecting the two units in series to one main and the neutral line. This system of making the electrical connections is satisfactory for use with this type of supply system but it does not have universal application to all of the different types of supply systems which are in use in different localities. For example, if the supply system were of the type in which the voltage between all the conductors is the same then only two different rates of heat generation would be obtained by this system. In a like manner this system is not satisfactory for use with supply systems in which the three conductors are connected to two main lines and the neutral lines of a three-phase Y-connected secondary distribution system because the voltage between the main lines is not twice the voltage between one main line and the neutral line and the difference between the maximum and the minimum heat generation would not be sufficient.

These connections are generally controlled by a double action rotary snap switch having four positions; one is the off position and the other three positions are the different positions for completing the connections for the different rates of heat generation. These switches are subject to severe operating conditions because of the high load current, high temperature, and the comparatively small distance between the different operating positions of the switch.

An object of my invention is to provide an improved system for making the electrical connections to obtain the three different rates of heat generation which will have universal application. Another object of my invention is to provide an improved double action rotary snap switch of sturdy construction that will withstand the continued severe usage and in addition will be composed of a few parts easy to assemble and of low cost of manufacture.

My invention will be better understood from the following detailed description when taken in connection with the accompanying drawing and the scope of the invention will be pointed out in the appended claims.

In the accompanying drawing, Fig. 1 is a side elevation of the electric switch; Fig. 2 is a view in perspective from the front of the switch with the rotary member removed; Fig. 3 is a plan view of the base member of the switch and a diagrammatic view of the electrical circuit connections; Fig. 4 is a cross sectional view of the base member along the line 4—4 of Fig. 3 in the direction indicated by the arrows; Fig. 5 is a cross sectional view of a part of the rotor and rotor contact; Fig. 6 is an enlarged view in perspective of a rotor contact; and Fig. 7 is a rear view of the rotor.

A double action rotary snap switch is indicated generally by the numeral 10 and comprises two major parts, a unitary base member 11 and a rotor 12. Such a switch may be moved in either direction to the desired position. Rotor 12 is mounted on a shaft 13 on the end of which is secured an operating and indicating handle 14 to move the rotor from one position to another and to indicate its position.

The base member 11 is of insulating material which may be a phenolic condensation product or similar material that may be molded and is non-frangible. Referring to Figs. 2 and 3, the base member 11 has four groups of contact blades of arcuate shape projecting from it of which the inner contact blades 15, 16, 17 and 18 are spaced the same radial distance from the center of the base. The outer contact blades 19, 20, 21 and 22 are spaced equal radial distances from the inner contacts. Contact blades 18 and 22 are shorter than the other contacts. For connecting the inner contact blades of the groups to the load conductors three binding screws are provided. One binding screw is threaded in an aperture in a connector 23 which is connected to contact blade 15 as indicated in dotted lines in Fig. 3. Another binding screw is threaded in an aperture in connector 24 which is connected to inner contact blade 16 as shown in dotted lines. The third binding screw is threaded in an aperture in connector 25 which is connected to inner contact blades 17 and 18 as indicated by dotted lines. To connect the outer contact blades with the supply circuit, binding screws are provided and threaded in apertures in connectors which are connected to the outer contact blades. A connector 26 is connected to outer contact blade 19. Outer contact blades 19 and 21 are connected by means of a connector 27 shown in dotted lines. A connector 28 is connected to outer contact blade 20 shown in dotted lines. A connector 29 is connected to outer contact blade 22. To cooperate with the operating mechanism mounted on the rotor, a base plate 30 is molded in base member 11 and has four projections which cooperate with the detent of the operating mechanism to hold the switch in one of its four different operative positions. To hold more securely the base plate 30 in the base member 11 and also to provide a bearing surface for the shaft 13, bushing 31 is molded in a central opening of the base member as best indicated in Fig. 4.

The rotor 12 comprises an insulating member having an annular depending flange 12' of insulating material which passes between the sets of stationary contacts when the rotor is operated from one position to another and serves to snuff out any arc that may be drawn as a circuit is broken. In recesses in this depending flange are located rotor contacts 32, 33 and 34 which consist of copper strips of U-shape, Figs. 5 and 6, connected to the insulating rotor member 12 by rivets. These contacts are of arcuate shape to engage the contacts of the base member and diverge from the ends secured to the rotor to create a contact pressure when in operative engagement with the contact blades in the base member, and also to compensate for any deviation in the spacing of the contact blades. The annular depending flange with the rotor contacts 32, 33 and 34 secured in recesses therein is best shown in Fig. 7. Contact 34 is longer than contacts 32 and 33 so it may engage short contact blades 18 and 22. Rotor 12 is mounted on a shaft 13 on which is also mounted an operating mechanism 35 which cooperates with base plate 30 to move the rotor by snap action from one position to another. Such operating mechanisms are well known to the art and since this mechanism forms no part of this invention it is not described.

To assemble the switch, shaft 13 is first inserted through the central opening of the rotor 12. The operating mechanism is assembled on the shaft and secured to the rotor. Handle 14 is threaded on the end of the shaft 13 until it engages a projection on the shaft to lock it in position. Assembly of the switch is then completed by inserting the shaft into bushing 31 in the base member 11 and locking it in position by means of a split washer 36 which engages transverse grooves in the end of shaft 13. If for any reason it is desired to remove the rotor 12 in order to replace it or to clean the contact surfaces, it is merely necessary to remove washer 36. Even though the switch 10 were mounted in position it would be quite a simple operation to remove the rotor without removing the whole switch unless the rear of base member 11 was entirely enclosed.

In Fig. 3 a diagrammatic view is shown of the method of making the electrical connections to a load consisting of two heating units X and Y and a supply circuit comprising conductors A, B and C. This system of connections is designed particularly for use in connection with a three wire heating system in which the two conductors A and C are connected to two main lines of a three phase system of distribution and the third conductor B is connected to the neutral or ground line of the system. However, it may be used on any three wire Edison system or on a two wire system with conductors A and B connected together.

The heating units X and Y are connected to the inner contact blades. The supply conductors are connected to the outer contact blades. When rotor 12 is in the position indicated in Figs. 1 and 2 no current is supplied to the load circuit. With the switch in this position, rotor contact 32 bridges contact blades 15 and 19 connecting the common point of the two heating units X and Y to supply conductor B. Rotor contact 34 bridges contacts 17 and 21 connecting the other side of heating unit X to supply conductor B. The remaining rotor contact 33 is in position over contacts 18 and 22 but due to the fact that these contacts are shorter than the other stationary contacts, a circuit is not completed between these contacts. Therefore, with the switch in this position, both sides of heating unit X are connected to the same supply conductor and the remaining terminal of heating unit Y is not connected to any conductor.

When the switch is rotated in a clockwise direction 90 degrees, the rotor contact 32 engages contact blades 16 and 20 completing a circuit from one side of heating unit Y to supply conductor A. Rotor contact 33 bridges contacts 15 and 19 completing a circuit from the midpoint connection between the heating units X and Y to supply conductor B. Rotor contact 34 is longer than the contact blades 32 and 33 and engages the short contact blades 18 and 22 to complete a circuit from the remaining terminal of heating unit X to supply conductor C. With the switch in this position, heating unit Y is connected to conductors A and B and heating unit X to conductors B and C. This position is what is known as the high-heat position of the switch. The midpoint connected between the heating units X and Y is brought through the neutral or ground conductor B in this position of the switch because when the conductors A, B, and C are connected to two phases and the neutral of a three phase supply system advantage is taken of the fact that the sum of the phase voltages to ground is greater than the resultant voltage between phases and a greater heating generation is obtained than if the heating unit were merely connected in series between conductors A and B.

When the switch is rotated again in a clockwise direction 90 degrees, rotor contact 32 engages contact blades 17 and 21 completing a circuit from one side of heating unit X to supply conductor B. Rotor contact 33 engages contacts 16 and 20 connecting one terminal of heating unit Y to supply conductor A. Rotor contact 34 engages contact blades 15 and 19 connecting the common terminals of heating units X and Y to supply conductor B. Thus, both sides of heating unit X are connected to supply conductor B and no current flows through it but heating unit Y is connected to conductors A and B. This position of the switch is known as the medium-heat position.

When the switch is again rotated in a clockwise direction 90 degrees, rotor contact 32 is in position above short contact blades 18 and 22 but is not long enough to engage them. Rotor contact 33 engages contact blades 17 and 21 connecting one terminal of heating unit X to supply conductor B. Rotor contact 34 engages contact blades 16 and 20 connecting one side of heating unit Y to supply conductor A. Heating units X and Y are connected in series to conductors A and C. This position of the switch is known as the low-heat position. The indicating handle serves to indicate the position that the switch has assumed and whether it has completed the circuit connection for high-heat, medium-heat or low-heat.

From the foregoing, it may be seen that I have provided an electric switch which is simple in construction and rugged to withstand severe operating conditions. In addition, the switch is so designed that the assembly and disassembly of it is a very simple operation requiring only the removal of a washer to remove the rotor when it is necessary to replace it. Also, the switch is of comparatively low cost of manufacture and its installation is simple and only involves an inexpensive operation. Also a system of making the electrical connections is provided which is of universal application to any of the standard systems of distribution in general use.

What I claim as new and desire to secure by Letters Patent of the United States, is:—

1. An electric switch comprising a unitary base of insulating material with contact blades molded therein, said contact blades spaced 90 degrees apart in four groups having two contact blades in each group spaced radially with the contact blades of one group shorter than the other contact blades, means to connect one contact blade of each group to a load circuit, means to connect the other contact blade of each group to a supply circuit, a rotor of insulating material with an integral depending annular flange having three contacts of U shape secured in recesses in the depending flange with one contact longer than the others to engage the short contact blades of the base, said rotor contacts being located 90 degrees apart, and means to move said rotor to different operative positions whereby the contact blades of different groups are selectively interconnected.

2. An electric switch comprising a unitary base of insulating material, contact blades secured to said base in groups having two contact blades in each group spaced radially with the contact blades in one group shorter than the other contact blades, a rotor of insulating material, and contacts of U-shape secured to said rotor with one contact longer than the others to engage the short contact blades of the base.

3. An electric switch comprising a unitary base of insulating material, contact blades secured to said base in four groups having two contact blades in each group spaced radially, a rotor of insulating material, three contacts of U-shape secured to said rotor and means to move said rotor to different operative positions whereby the contact blades of different groups are selectively interconnected.

4. An electric switch comprising a unitary base of insulating material, contact blades secured to said base in groups spaced 90° apart and having two contact blades in each group spaced radially, a rotor of insulating material, contacts of U-shape secured to said rotor and located 90° apart, and means to move said rotor to different operative positions whereby the contact blades of different groups are selectively interconnected.

5. An electric switch comprising a unitary base of insulating material, contact blades secured to said base spaced apart in four groups and having contact blades in each group spaced radially with the contact blades of one group shorter than the other contact blades, a rotor of insulating material, contacts of U-shape secured to said rotor with one contact longer than the others to engage the short contact blades, and means to move the rotor to different operative positions whereby the contact blades of different groups are selectively interconnected.

LESLIE A. KEMPTON.